(12) United States Patent
Chou

(10) Patent No.: US 7,835,163 B2
(45) Date of Patent: Nov. 16, 2010

(54) SWITCHING POWER CONVERTER WITH A SECONDARY-SIDE CONTROL

(76) Inventor: Chung Fu Chou, No. 1004, Dawan Rd., Yongkang City, Tainan County 710 (TW)

( * ) Notice: Subject to any disclaimer, the term of this patent is extended or adjusted under 35 U.S.C. 154(b) by 383 days.

(21) Appl. No.: 12/043,317

(22) Filed: Mar. 6, 2008

(65) Prior Publication Data
US 2008/0304295 A1      Dec. 11, 2008

(30) Foreign Application Priority Data
Jun. 11, 2007    (TW) .............................. 96120955 A

(51) Int. Cl.
*H02M 3/335* (2006.01)
(52) U.S. Cl. ........................ 363/21.07; 363/95; 323/222

(58) Field of Classification Search .................... 363/17, 363/20, 21.12, 21.15, 21.07, 49, 95, 98, 97; 323/282–288, 299, 303, 222
See application file for complete search history.

(56) References Cited

U.S. PATENT DOCUMENTS

| 4,400,767 | A | * | 8/1983 | Fenter | .................... | 363/21.15 |
| 7,023,717 | B2 | * | 4/2006 | Nakagawa | .................... | 363/95 |

* cited by examiner

*Primary Examiner*—Rajnikant B Patel

(57) ABSTRACT

This invention discloses a power converter with a secondary-side control, including an input circuit with one or more switches, an output circuit with an output end and a controller, and a transformer with a primary-side coil assembly connecting the switch(es) and a secondary-side coil assembly connecting the output circuit. The on/off state of the switch(es) is controlled by variations in voltage of primary-side coil assembly. The controller in the output circuit detects an output voltage and sends detected results to the primary-side coil assembly as a feedback for primary-side coil assembly to regulate the PWM or PFM action of the switch in a specific way to maintain voltage stability.

15 Claims, 12 Drawing Sheets

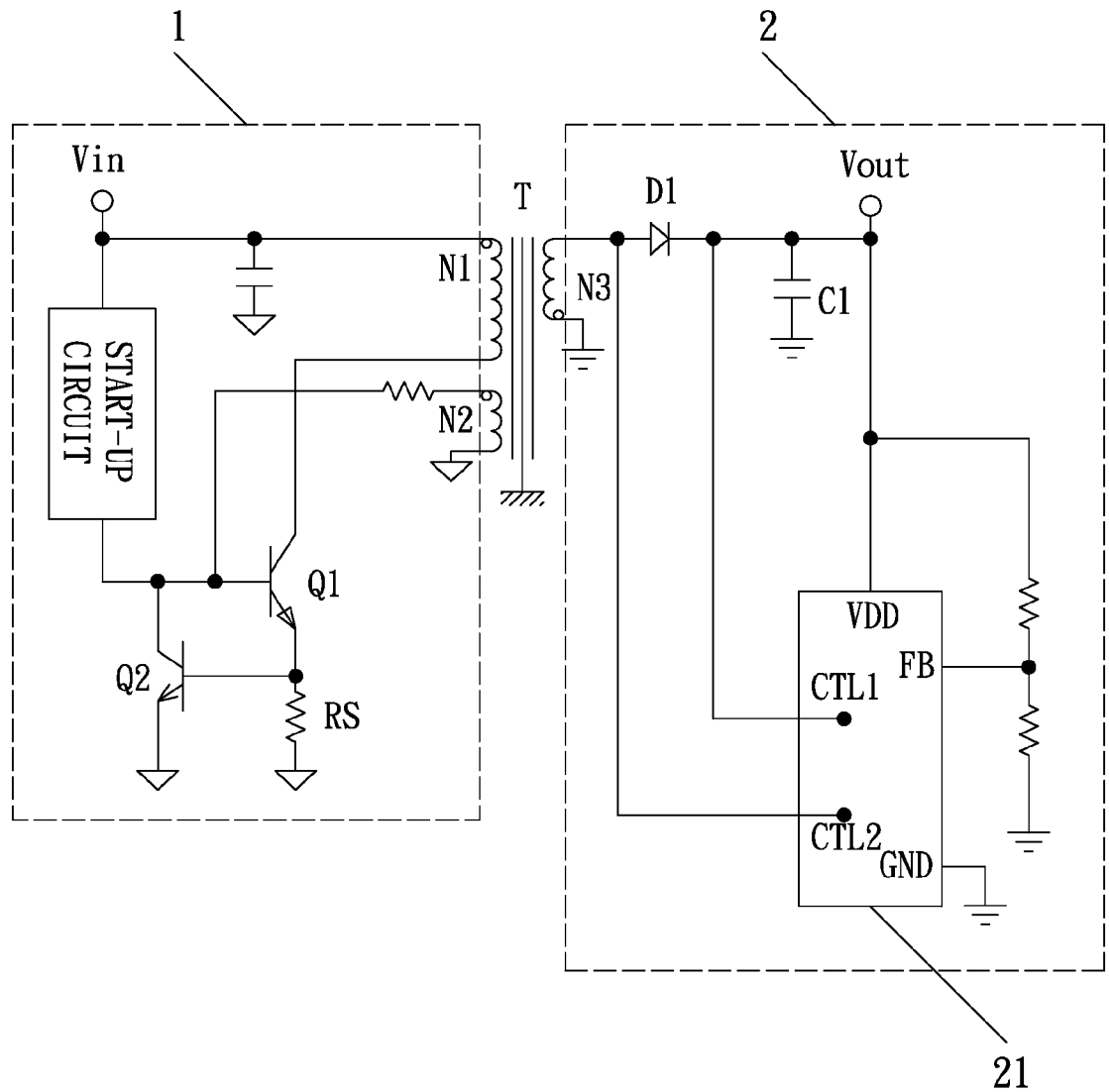
F I G . 7

SWITCHING POWER CONVERTER WITH A SECONDARY-SIDE CONTROL

BACKGROUND OF THE INVENTION

1. Field of the Invention

The invention relates to a switching power converter and more particularly, to a switching power converter that applies a secondary-side control to achieve system stability and durability.

2. Description of the Prior Art

Switching power converters have the advantages of high working efficiency and limited volume in size, and therefore, are widely used in a variety of electronic devices. FIG. 11 shows the circuit of a conventional flyback converter, including mainly an input circuit 1' (indicated by a dotted rectangle at the left), an output circuit 2' (indicated by a dotted rectangle at the right), a transformer T1' (in between the above two dotted rectangles), and an optical coupler 3'.

Referring to FIG. 11, an input circuit 1' connects to an input voltage Vin and includes mainly two parts, a transistor Q1' for switching, and, a controller 11' for regulating PWM (Pulse Width Modulation). The transistor Q1' connects to the primary-side coil assembly of the transformer T1' at one end, and also connects to the output end of the controller 11' at the other. The input end FB of the controller 11' connects to one end of the optical coupler 3'.

At the system output side (indicated by a dotted rectangle at the right in FIG. 11) an output circuit 2' connects to a secondary-side coil assembly of the transformer T1'. The output voltage Vout connects in parallel to one end of the optical coupler 3', isolating the input circuit 1' from the output circuit 2', and conveying the output voltage Vout back to the controller 11' (of the input circuit 1'). Consequently, the controller 11' is able to output a more or less stable voltage in correspondence to an output by controlling the on-off states of the transistor T1'.

To sum up, the above-mentioned prior art (illustrated in FIG. 11) makes use of the feed-back control function of an optical coupler to manage the output voltage; the physical characteristics of an optical coupler unavoidably effects the stability and durability of the system. For instance, the coupling efficiency of an optical coupler reflects the accuracy of an output voltage. Furthermore, extra electric elements are required to avoid or reduce the unstable performance of an optical coupler when it is used as a current-stabilizing current charger, adding more cost and bringing in more idleness and worn-out.

FIG. 12 illustrates the electric circuits of another conventional flyback converter, including mainly an input circuit 5' (indicated by a dotted rectangle on the left-hand side of FIG. 12), a transformer T2', an output circuit 6' (as indicated by a dotted rectangle on the right-hand side of FIG. 12). Unlike a conventional converter shown in FIG. 11, the transformer T2' (shown in FIG. 12) includes three coils: two coils on the primary-side coil assembly (i.e. a primary-side $1^{st}$ coil assembly, and a primary-side $2^{nd}$ coil assembly) and one on the secondary-side coil assembly (i.e. a secondary-side $3^{rd}$ coil assembly).

The input circuit 5' connects to an input voltage Vin and includes two main parts: a transistor Q2' for switching, and a controller 51' for regulating PWM. One end of the transistor Q2' connects to the primary-side $1^{st}$ coil assembly N1' (of the transformer T2'), and the other end, to the output end of the controller 51'. The input end of the controller 51' connects to the primary-side $2^{nd}$ coil assembly N2' (of the transformer T2').

At the system output side (indicated by a dotted rectangle at the right of FIG. 12), the output circuit 6' with an output voltage of Vout connects to the secondary-side $3^{rd}$ coil assembly N3' (of the transformer T2'). Variations in voltage is conveyed from secondary-side coil assembly (of the transistor T2') to primary-side coil assembly (of the transformer T2') and is detected by the controller 51'. As a result, the controller 51' regulates the output voltage Vout by detecting variations in voltage, and then by controlling the switching on/off of the transistor Q2'.

The above-mentioned conventional circuit has the merit of simplicity in structure, which, nevertheless, relies completely upon the physical characteristics of the transformer T2' to detect variations in voltage and to regulate the output circuit accordingly. Furthermore, the voltage conveyed back is not continuous, affecting adversely the stability and durability in the electric system, the no-load output voltage, as well as in the efficiency of dynamic voltage management.

SUMMARY OF THE INVENTION

The object of the invention is to control the switching on/off the transistor (located in the primary-side coil assembly) for more reliability and precision in the electric output system by way of a controller, located in the secondary-side coil assembly of a transformer.

BRIEF DESCRIPTION OF THE DRAWINGS

FIG. 7 illustrates the reaction of the controller when the output voltage goes under a pre-set threshold.

DETAILED DESCRIPTION OF THE PREFERRED EMBODIMENT

Figure 1:
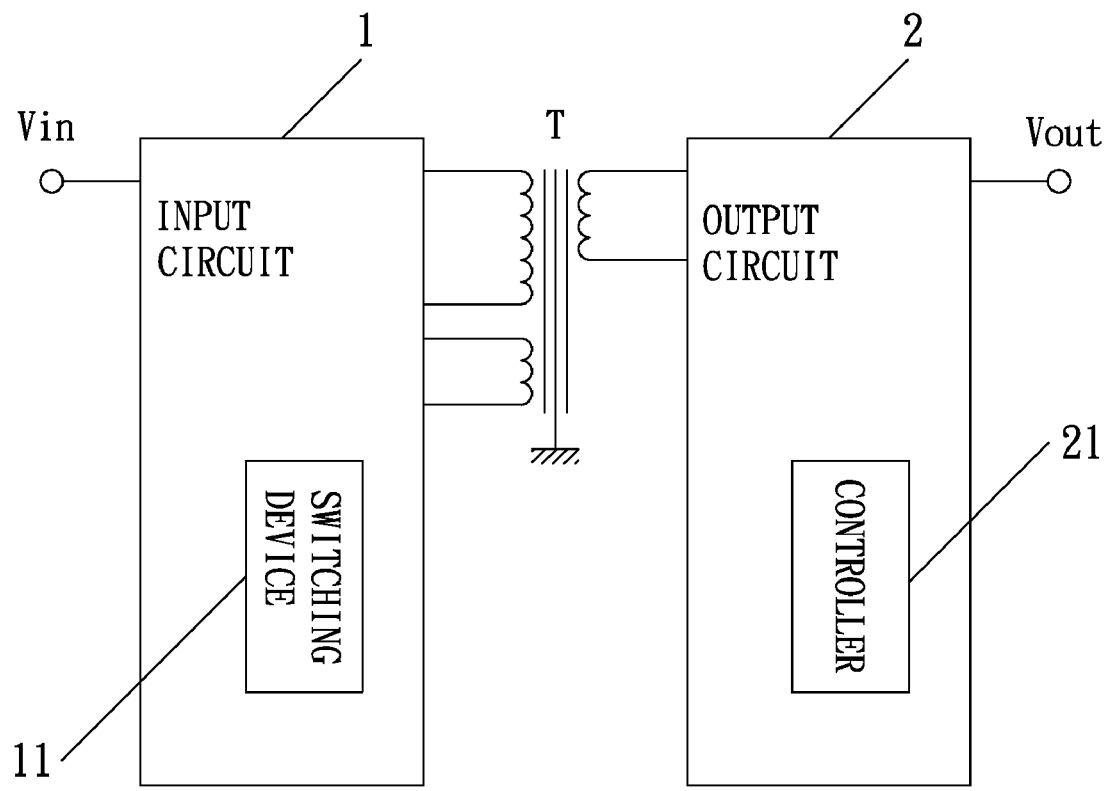
FIG. 1 is an illustration of the basic circuit structure of this invention.

Referring to FIG. 1, the invention includes mainly an input circuit 1, a transformer T, and an output circuit 2. The input circuit 1 includes one ore more switching devices 11, an input end, and an output end; the input end of input circuit 1 connects to an input voltage Vin, while the output end of input circuit 1 connects to transformer T. Switching device 11 could be a transistor, a MOSFET, a single device, or an assembly of devices with a switching function.

Transformer T includes a primary-side coil assembly and a secondary-side coil assembly. The primary-side coil assembly (of transformer T) connects to switching device 11 (of input circuit 1) and controls the on/off states of switching device 11 in reaction to variations in voltage; while the secondary-side coil assembly (of the transformer T) connects to output circuit 2.

Figure 2:
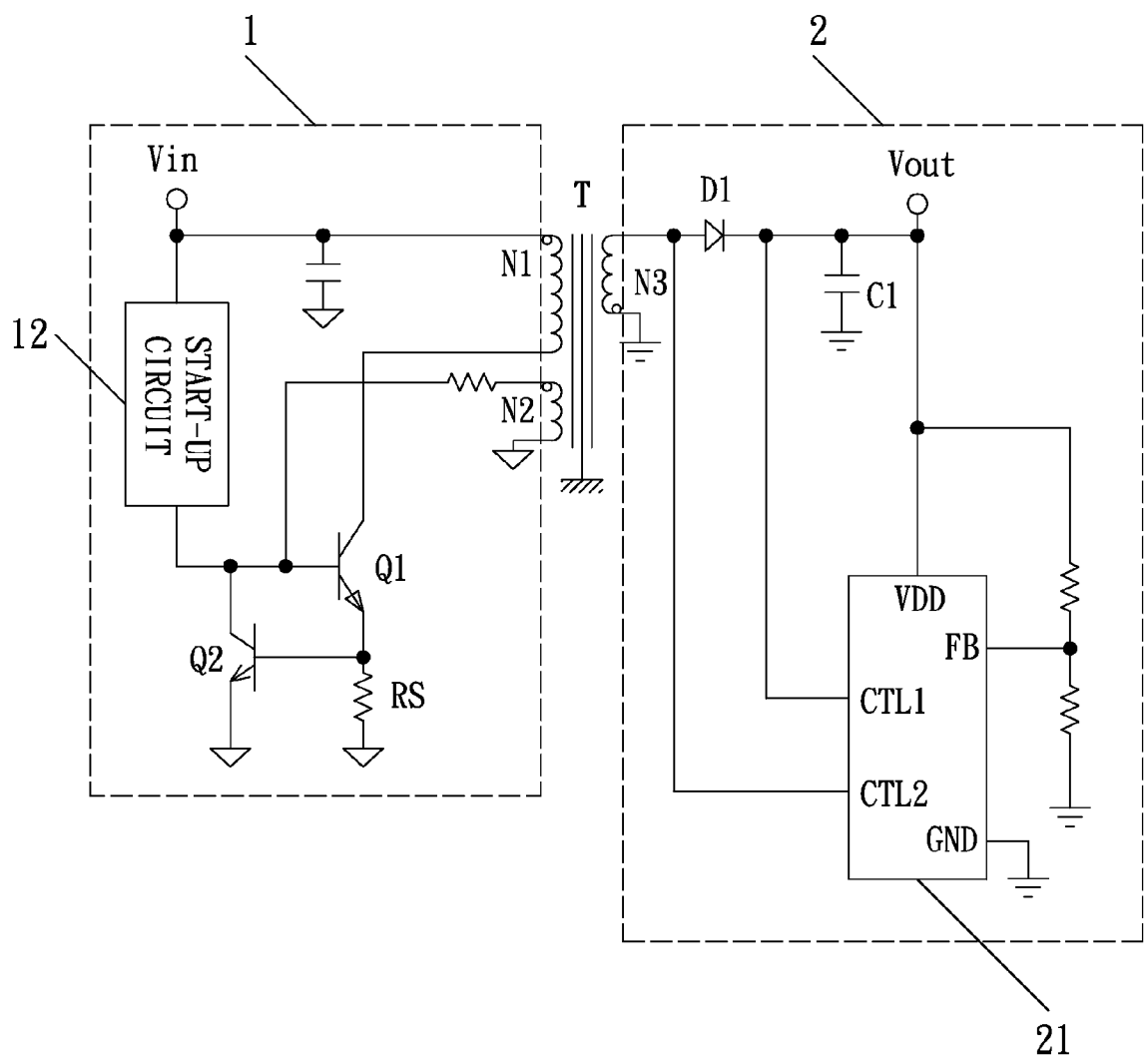
FIG. 2 is an illustration of the circuit configuration of the $1^{st}$ embodiment of this invention.

The input energy from input circuit 1 is conveyed by transformer T to the output end of the output circuit 2 as an output voltage Vout, as shown in FIG. 2. The output circuit 2 further includes a controller 21 to detect differences in voltage between output voltage (Vout) and a pre-set voltage threshold, and forward to the primary-side coil assembly as a decision-making feedback the voltage differences. The primary-side coil assembly (of the transformer) then reacts to voltages differences by controlling the on/off states of switching element 11 in PWM or PFM to stabilize output voltages.

Still referring to FIG. 2, a preferred embodiment of the invention is a self-excited flyback converter. The primary-side coil assembly (of the transformer T) includes a $1^{st}$ coil assembly N1 and a $2^{nd}$ coil assembly N2, both of which are of the same polarity. The secondary-side coil assembly (of the transformer T) includes a $3^{rd}$ coil assembly with a polarity opposite to that of $1^{st}$ coil assembly N1 and that of $2^{nd}$ coil assembly N2. The input end of input circuit 1 connects with an input voltage Vin, which in turn connects to the input end of a start-up circuit 12 and to one end of $1^{st}$ coil assembly N1 (of transformer T).

Switching device 11 in this embodiment includes a transistor Q1 and a transistor Q2. The output end of the start-up circuit 12 connects to Base terminal (B) of $1^{st}$ transistor Q1; while Collector terminal (C) of $1^{st}$ transistor Q1 connects to one end of $1^{st}$ coil assembly N1. One end of $2^{nd}$ coil assembly N2 (of primary-side coil assembly of transformer T) connects to a current-restrictive resistor and then to terminal Base (B) of $1^{st}$ transistor Q1, while the other end of $2^{nd}$ coil assembly N2 is grounded. Terminal Emitter (E) of $1^{st}$ transistor Q1 connects to a grounding resistor RS. $1^{st}$ transistor Q1 connects to a current-restrictive protective circuit, including a $2^{nd}$ transistor Q2, of which terminal Base (B) connects to terminal Emitter (E) of $1^{st}$ transistor Q1, terminal Collector (C) connects to terminal Base (B) of the $1^{st}$ transistor, and terminal Emitter is grounded.

Still referring to FIG. 2, the output circuit 2 includes a rectifying diode D1 with the anode (i.e. more positive terminal) connects to one end of $3^{rd}$ coil assembly N3 (of transformer T); while the other end of $3^{rd}$ coil assembly N3 is grounded. The cathode (i.e. more negative terminal) of rectifying diode D1 connects to the output end thereof, with the output end of D1 connects in parallel to a grounding capacitor C1.

The output circuit 2 in FIG. 2 includes a controller 21 with a VDD voltage and a grounding point GND. Voltage VDD (of controller 21) connects to an output voltage Vout. The input feedback end FB of controller 21 connects to a voltage-divider point (of two resistors in series), and also includes a deviation amplifier with a reference voltage (not shown in FIG. 2) for calculating deviations or variations of output voltages. The two control ends of controller 21, the $1^{st}$ CTL1 and $2^{nd}$ control end CTL2, connect to the two ends of Diode D1, respectively. Three states in terms of circuit configuration that may appear between CTL1 and CTL2 are regulated by controller 21, including a resistor load connection, a short circuit, and an open circuit.

Figure 3:
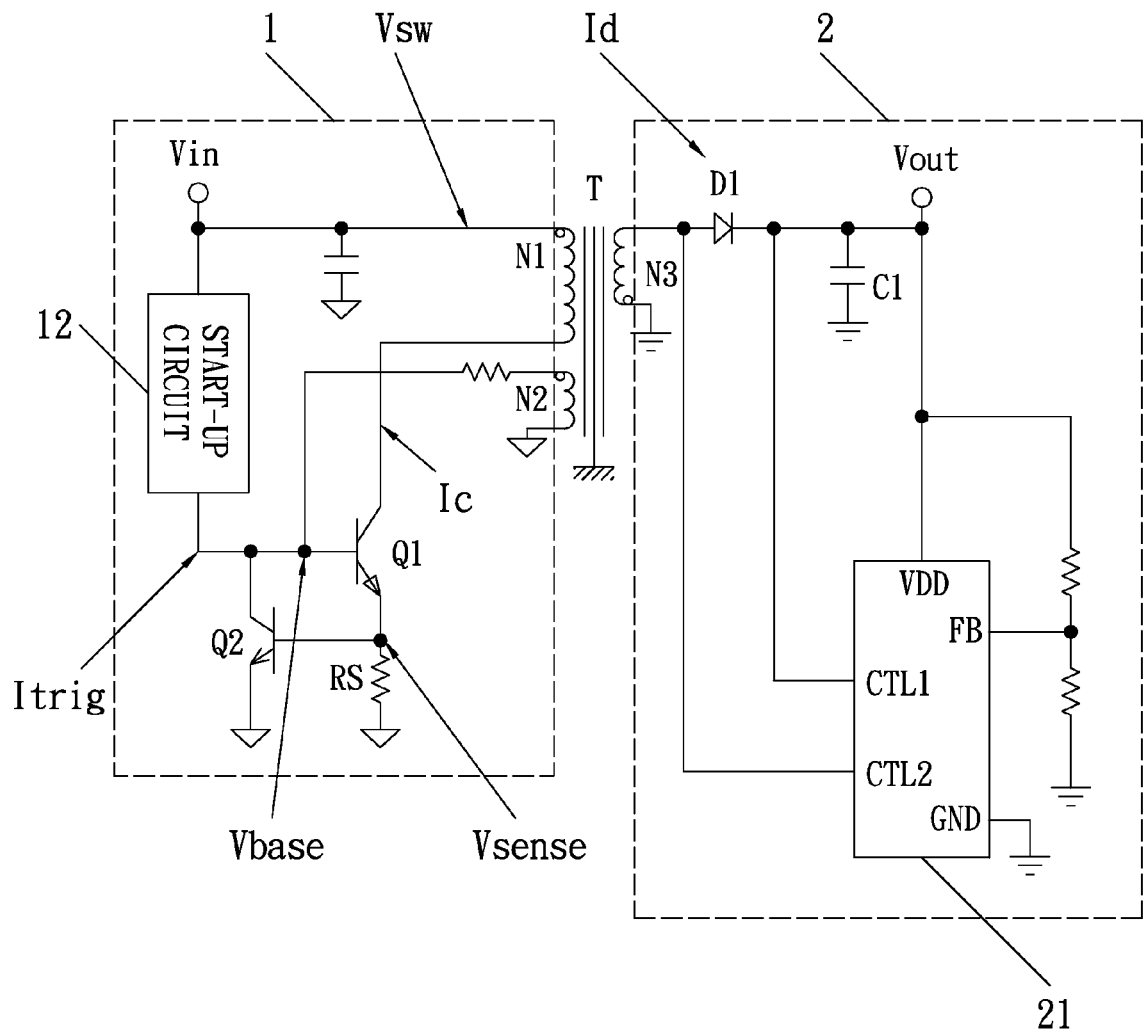
FIG. 3 is an illustration of the voltage and current points of the $1^{st}$ embodiment of this invention.
Figure 4:
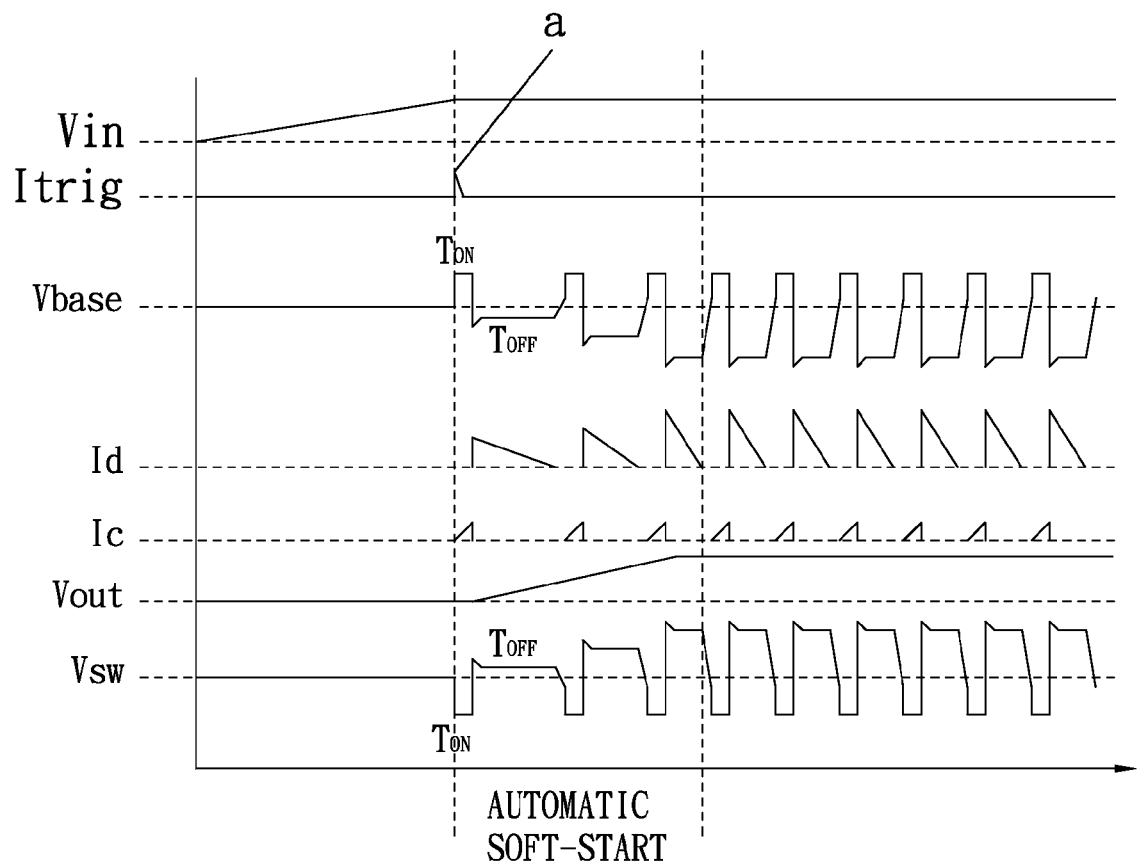
FIG. 4 is an illustration of the wave motions corresponding to FIG. 3.

Referring to FIGS. 3 and 4, when in activation, a working voltage Vin is sent to the input end of input circuit 1, making start-up circuit 12 generate a pulse a to turn on $1^{st}$ transistor Q1 with a collector current Ic. The input current flows through $1^{st}$ coil assembly N1 (of transformer T), $1^{st}$ transistor Q1, and resistor RS before grounding; part of the current also flows through $2^{nd}$ coil assembly N2 (of transformer T), $1^{st}$ transistor Q1 and resistor RS before grounding. When all this happens, the upper polarity of $1^{st}$ and $2^{nd}$ coil assembly is both positive, while that of $3^{rd}$ coil assembly is negative. In the mean time, the voltage increases when $1^{st}$ transistor Q1 connects in serial to resistor RS, turning on $2^{nd}$ transistor Q2 and, at the same time, turning off $1^{st}$ transistor Q; energy from the primary-side coil assembly is therefore transferred to the secondary-side coil assembly, and the polarity of $3^{rd}$ coil assembly N3 is reversed for current to go through Diode D1 to generate an output voltage Vout and current Id. When the energy in $3^{rd}$ coil assembly is completely released, the polarity of transistor T changes, and the energy stored in the parasitic inductance in $2^{nd}$ coil assembly N2 (of transformer T) will again activate $1^{st}$ transistor Q1. The invention is hence capable of making an automatic soft-start and a self-excitation by ringing, and operates in a non-continuous mode. Start-up circuit 12 is idle without consuming further energy after the first start-up; start-up pluses are sent out either when the system reaches the pre-set time limit for idleness or when reset conditions are met.

Figure 5:
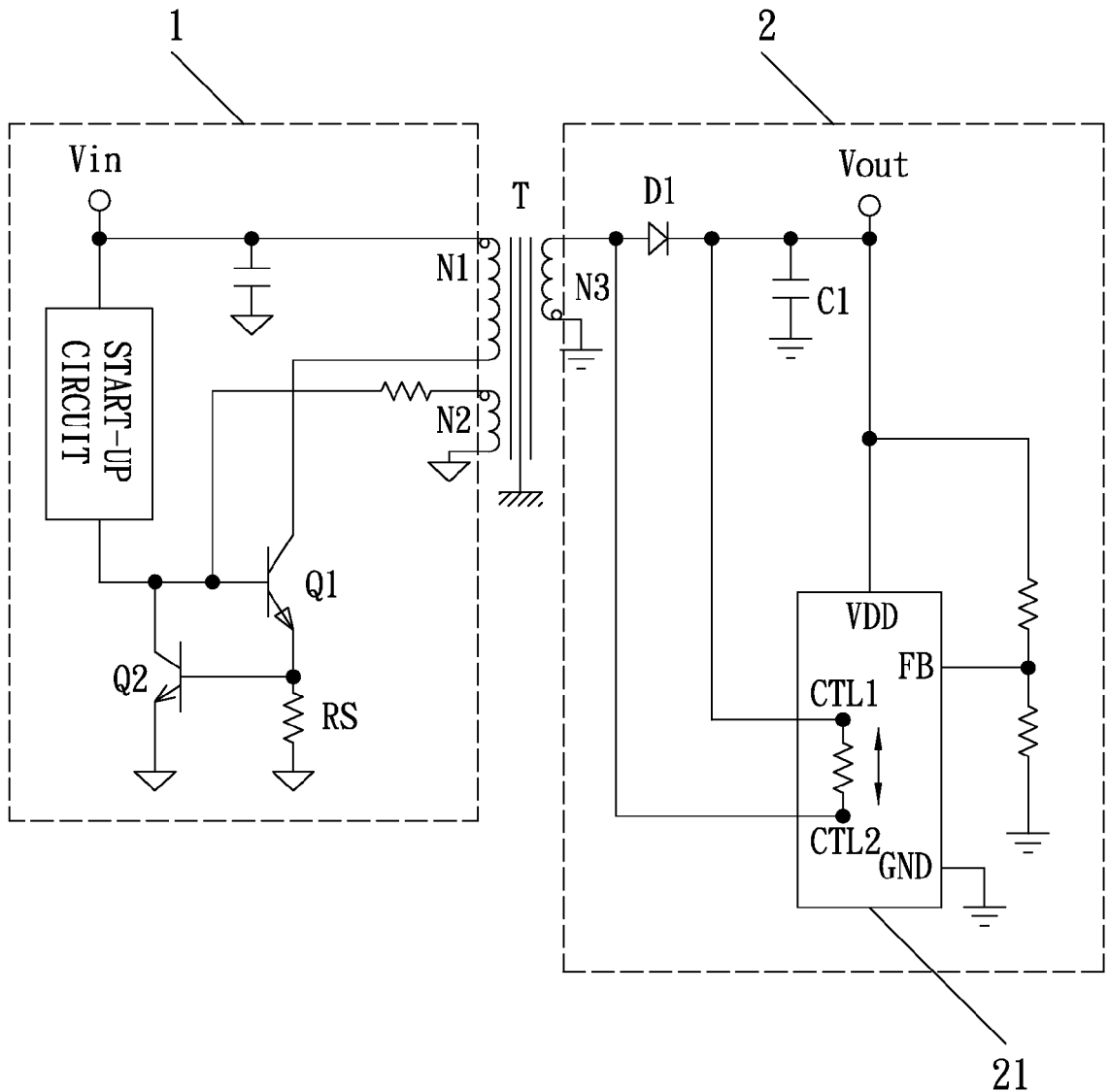
FIG. 5 illustrates the inactive mode of the controller when the output voltage goes above a preset threshold.

Referring to FIGS. 3, 5, 7, and 8, controller 21 operates in accordance with the detected variations in voltage Vout: when output voltage Vout is higher than the pre-set voltage, controller 21 controls the two control ends CTL1 and CTL2 so that it can connect to a negative resistor load from the moment when energy in transformer T is completely transferred to the output end until the instant that $1^{st}$ transistor Q1 re-starts; consequently, when Id is equal to zero, the resistor load consumes the residual energy from leakage inductance of transformer T, and the current of which flows as indicated by an arrow in FIG. 5, stopping $1^{st}$ transistor Q1 from being activated and also reversing back to an open circuit (as shown in FIG. 7) to avoid voltage Vout from keeping rising and hence to stabilize output voltages.

Figure 6:
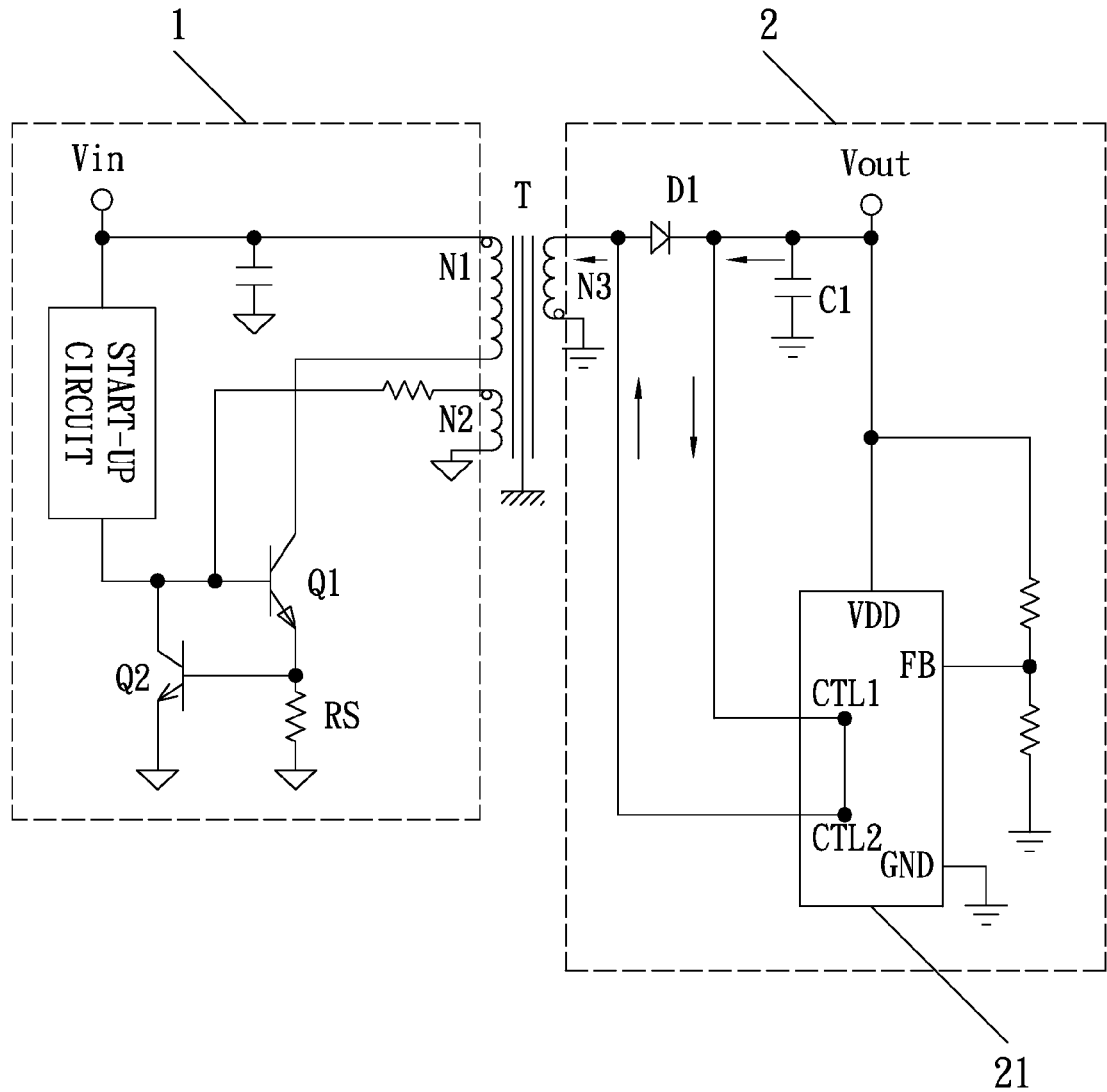
FIG. 6 illustrates the re-start mode of the controller by the secondary-side coil assembly when the output voltage goes below a preset threshold.
Figure 8:
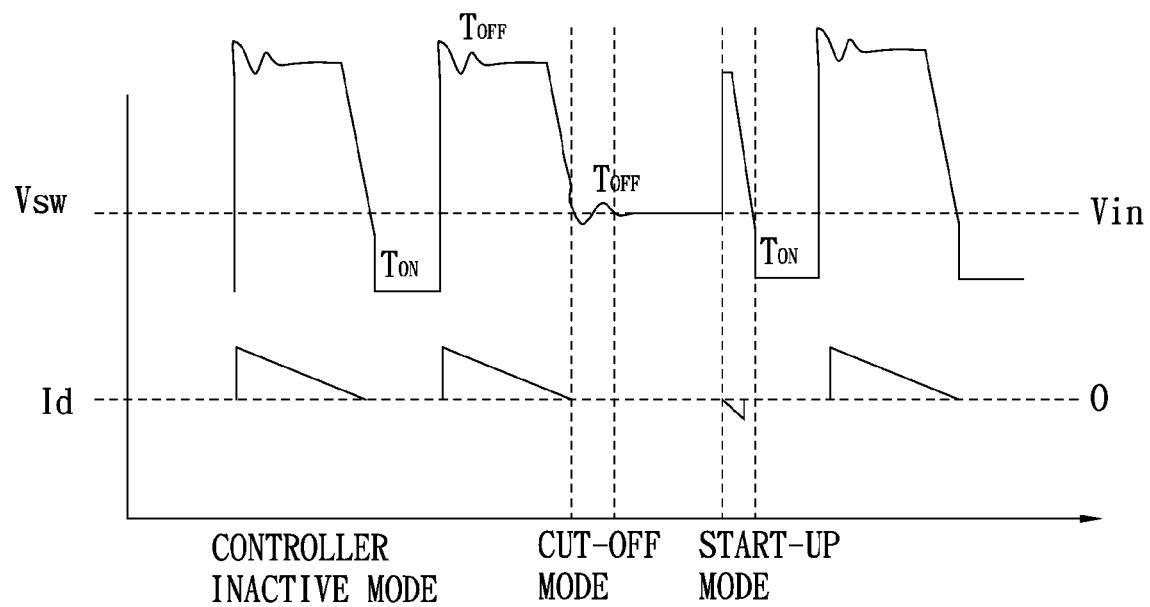
FIG. 8 illustrates the wave forms corresponding to FIGS. 5, 6, and 7.

Referring to FIGS. 6 and 8, when output voltage Vout is lower than the pre-set voltage, controller 12 first creates a transient short circuit between CTL1 and CTL2, and in the mean time, transfers energy in capacitor C1 (of output circuit 2) to $3^{rd}$ coil assembly N3, while current ID goes down accordingly. Afterwards, controller 21 makes an open circuit between CTRL 1 and CTRL 2, as shown in FIGS. 7 and 8, making voltage Vsw drop; it is now the energy in $2^{nd}$ coil assembly N2 that re-starts and turns on $1^{st}$ transistor Q1, and the circuit is again back to the state of self-excited conversion, while energy in input circuit 1 is transferred quickly to output circuit 2 and hence raises output voltage Vout to maintain voltage stability.

To sum up, by way of controller 21 (of the secondary-side coil assembly of transformer T) in this invention, $1^{st}$ transistor Q1 (of the primary-side coil assembly of transformer T) adequately performs the action of PWM or PFM to stabilize output voltage Vout. Since controller 21 detects directly the output voltage Vout, deviations or variations are reduced and higher precision is achieved with another desired effect of a synchronous rectifier. Furthermore, absence of optical couplers contributes to system durability and reliability.

Figure 9:
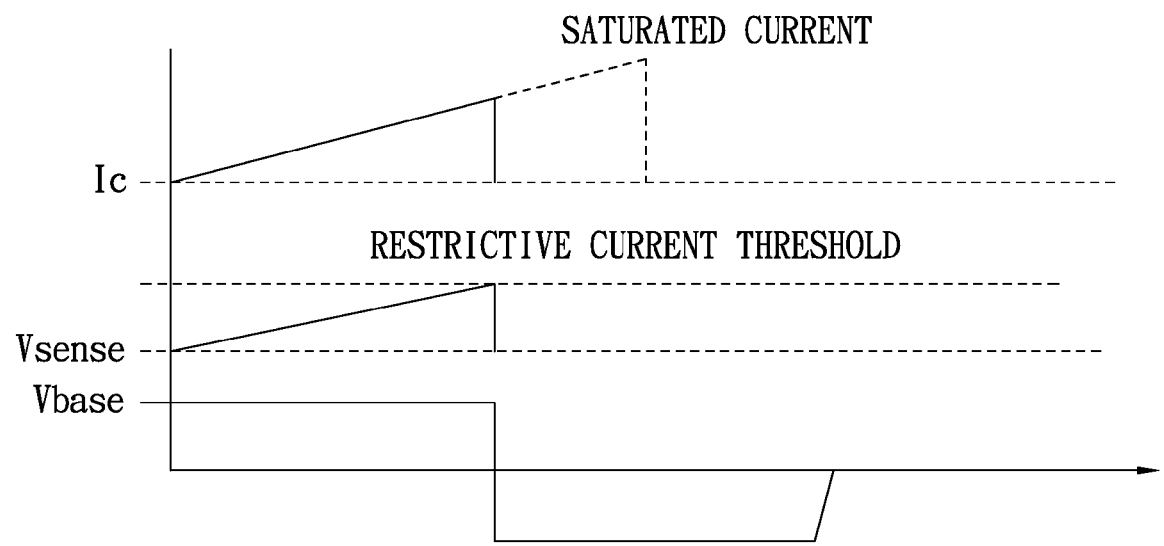
FIG. 9 illustrates the wave forms of the second transistor of the $1^{st}$ embodiment as a restrictive-current protective device.

Referring to FIGS. 3 and 9, when output circuit 2 of the secondary-side coil assembly of transformer T shorts or overloads (for instance, due to malfunction of diode D1), current Ic of $1^{st}$ coil assembly N1 (of the primary-side coil assembly of transformer T) will quickly increase, and the voltage Vsense of resistor RS of output circuit 1 will turn on $2^{nd}$ transistor Q2 while $1^{st}$ transistor Q1 is off for the system to stop functioning. System will be re-activated by start-up circuit 12 when short circuit or overload disappears. In other words, $2^{nd}$ transistor functions by delimiting currents to protect the system.

When output circuit 2 has a short circuit, controller 21 will idolize both CTL1 and CTL2 for a period of substantial time for start-up circuit to do reset until the phase of short circuit is over. Both low manufacturing cost and high working efficiency of the start-up circuit help to contribute to the empirical rating of the invention.

Figure 10:
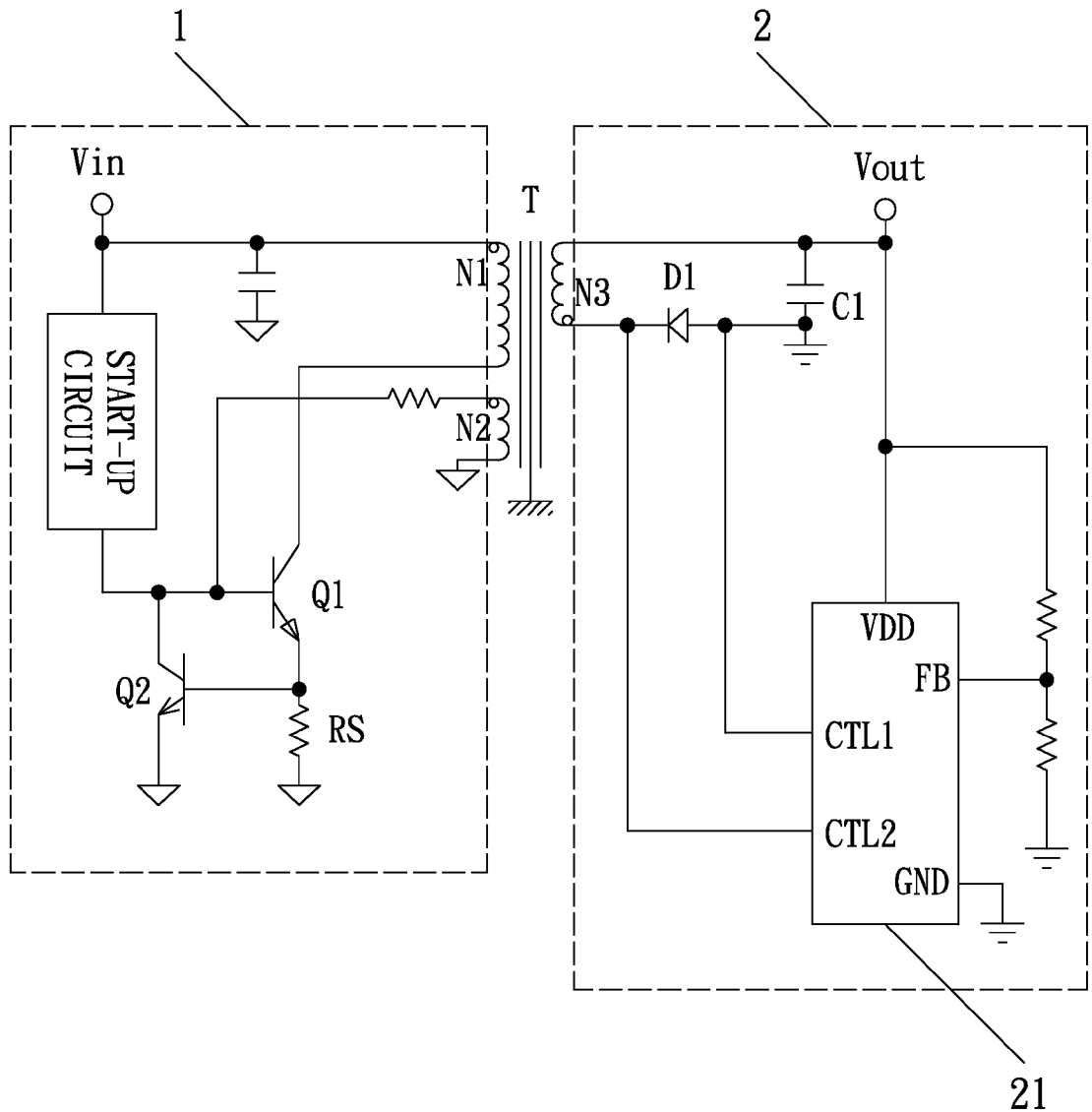
FIG. 10 is an illustration of the circuit configuration of the $2^{nd}$ embodiment of this invention.
Figure 11:
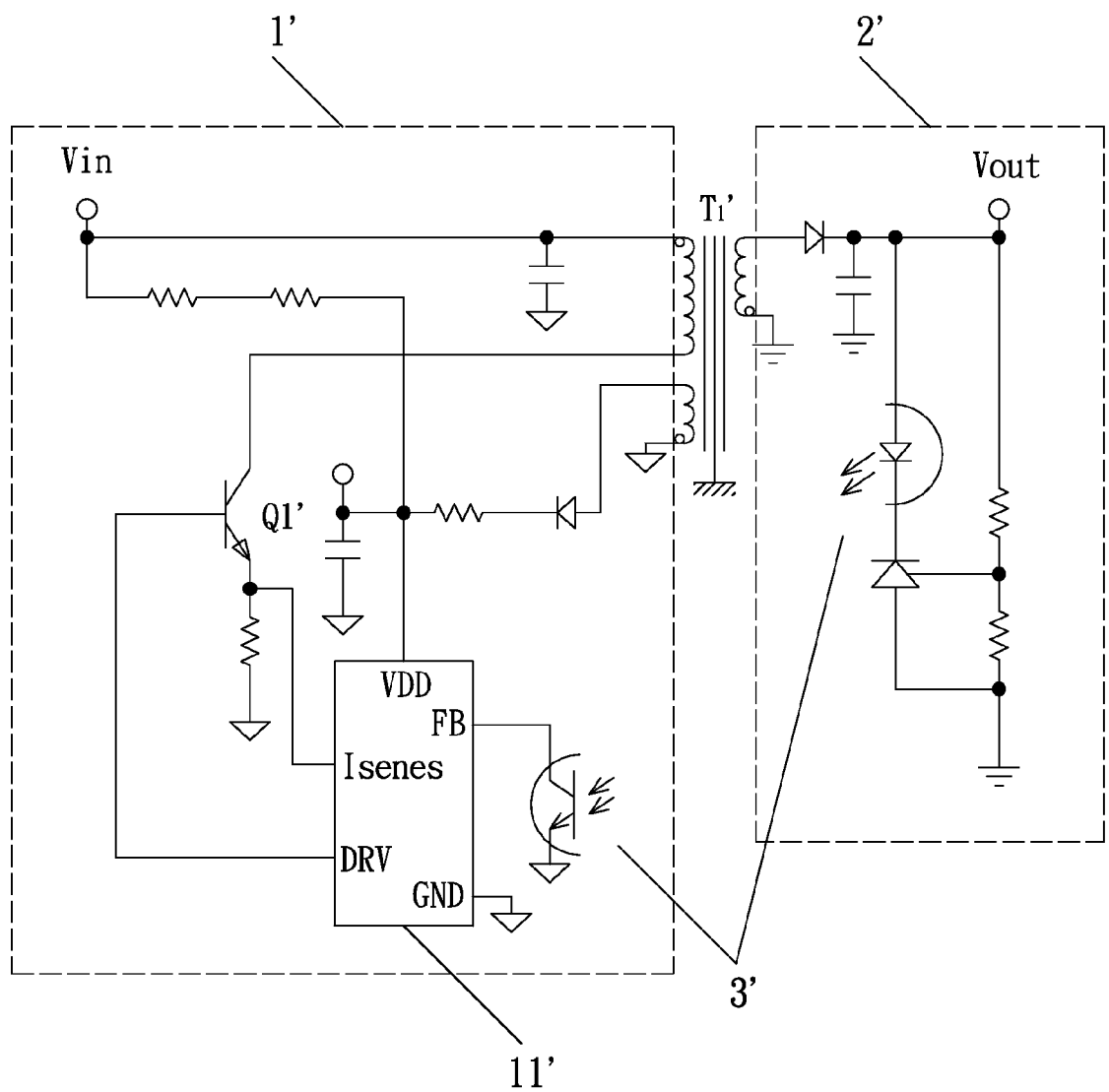
FIG. 11 is an illustration in circuit configuration of a conventional flyback converter with an optical coupler.
Figure 12:
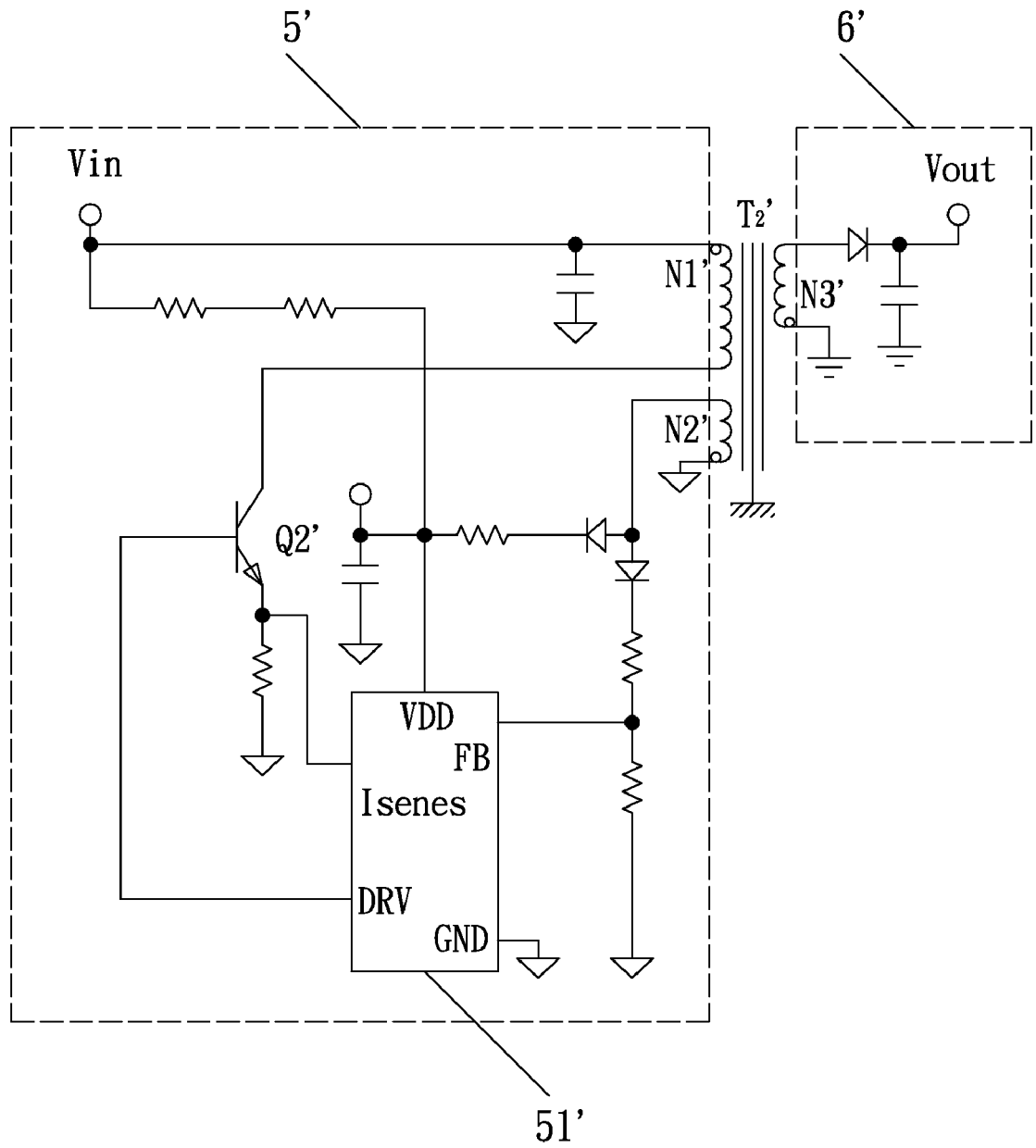
FIG. 12 is an illustration in circuit configuration of another conventional flyback converter.

Referring to FIG. 10, the $2^{nd}$ embodiment of the invention is very similar to the $1^{st}$ embodiment discussed above. The difference between the two embodiments lies in the location of the rectifying diode D1, which is now positioned beneath $3^{rd}$ coil assembly and the grounding position, with a polarity opposite to that of the $1^{st}$ embodiment but with the same function of self-excitation for conversion as the $1^{st}$ embodiment. Furthermore, the value of control threshold of CTL1 and CTL2 of controller 21 can be adjusted in reaction to voltage variations for the same controlling effect. The function of synchronous rectifier can also be added onto controller 21 for more working efficiency.

Although two preferred embodiments in accordance with the present invention have been provided in this application, it is to be understood that many other possible modification and variations can be made without departing from the scope of the present invention hereafter claimed.

I claim:

1. A power converter with a secondary-side control, including
    an input circuit with at least one switch;
    a transformer with a primary-side coil assembly and a secondary-side coil assembly, wherein said primary-side coil assembly connects to said switch, and voltage variations of said primary-side coil assembly regulates the on/off states of said switch;
    an output circuit with an output end, including
        a controller; and
        a rectifier diode with two ends, wherein said output circuit connects to said secondary-side coil assembly of said transformer for input energy in said input circuit to go through said transformer and then transfer to said output circuit to generate an output voltage, said controller detects and react to said output voltage by making said primary-side coil assembly to control said switch in a PWM or PFM action, and said controller further includes two control ends, a 1st and a 2nd control end, each connected to one of said two ends of said rectifier diode,
    wherein said controller determines three different states in circuit configurations between said two control ends, including a resistor load connection, a short circuit, and an open circuit.

2. The power converter with a secondary-side control as claimed in claim 1, wherein, a resistor load connection and an open circuit appear between said two control ends at the command of said controller when said output voltage at said output end goes above a pre-set voltage threshold.

3. The power converter with a secondary-side control as claimed in claim 2, wherein said switch of said input circuit is a $1^{st}$ transistor, a short circuit and an open circuit appear between said two control ends at the command of said controller when said output voltage at said output end goes below a pre-set voltage threshold.

4. A power converter with a secondary-side control, including
    an input circuit with at least one switch;
    a transformer with a primary-side coil assembly and a secondary-side coil assembly, wherein said primary-side coil assembly connects to said switch, and voltage variations of said primary-side coil assembly regulates the on/off states of said switch;
    an output circuit with an output end, including a controller, wherein said output circuit connects to said secondary-side coil assembly of said transformer for input energy in said input circuit to go through said transformer and then transfer to said output circuit to generate an output voltage, and
    said controller detects and react to said output voltage by making said primary-side coil assembly to control said switch in a PWM or PFM action, wherein
    said input circuit, said transformer, and said output circuit are assembled in circuit as a self-excited flyback converter, and said controller is capable of making one or more state changes in circuit configuration, said switch of said input circuit is a 1st transistor, and
    said primary-side coil assembly includes a 1st coil assembly and a 2nd coil assembly with the same polarity, and said secondary-side coil assembly includes a 3rd coil assembly with a polarity opposite to that of said 1st coil assembly and said 2nd coil assembly; said input circuit further includes a start-up circuit with the input end of said input circuit connects to an input voltage, to an input end of said start-up circuit, and to one end of said 1st coil assembly of said primary-side coil assembly, while the output end of said start-up circuit connects to terminal Base of said 1st transistor, and the other end of said 1st coil assembly connects to terminal Collector of said 1st transistor; one end of said 2nd coil assembly of said primary-side coil assembly of said transformer connects to a resistor and to terminal Base of said 1st transistor, while the other end of said 2nd coil assembly of said primary-side coil assembly of said transformer connects to ground, and terminal Emitter of said 1st transistor connects to said resistor and to ground.

5. The power converter with a secondary-side control as claimed in claim 4, wherein said 1st transistor connects to a restrictive-current protective circuit, said restrictive-current protective circuit includes a 2nd transistor, and terminal Base of said 2nd transistor connects to terminal Emitter of said 1st transistor, terminal Collector of said 2nd transistor connects to terminal Base of said 1st transistor, and terminal Emitter of said 2nd transistor connects to ground.

6. The power converter with a secondary-side control as claimed in claim 5, wherein said output circuit includes a rectifier diode with two ends, said output end of said output circuit connects in parallel to a capacitor and also connects to ground, the input end of said controller of said output circuit connects to an output voltage, and said controller further includes two control ends, a 1st and a 2nd control end, each connected to one of said two ends of said rectifier diode.

7. The power converter with a secondary-side control as claimed in claim 6, wherein said controller determines three different states in circuit configurations between said two control ends, including a resistor load connection, a short circuit, and an open circuit.

8. The power converter with a secondary-side control as claimed in claim 7, wherein a resistor load connection and an open circuit appear between said two control ends at the command of said controller when said output voltage at said output end goes above a pre-set voltage threshold.

9. The power converter with a secondary-side control as claimed in claim 8, wherein a short circuit and an open circuit appear between said two control ends at the command of said controller when said output voltage at said output end goes below a pre-set voltage threshold.

10. A power converter with a secondary-side control, including
- a transformer including a primary-side coil assembly and a secondary-side coil assembly, wherein said primary-side coil assembly further includes a 1st coil assembly and a 2nd coil assembly of the same polarity, and said secondary-side coil assembly further includes a 3rd coil assembly of a polarity opposite to that of said 1st coil assembly and that of said 2nd coil assembly;
- an input circuit with a start-up circuit, wherein the input end of said input circuit connects to an input voltage, to an input end of said start-up circuit, and to one end of said 1st coil assembly of said primary-side coil assembly of said transformer, while the output end of said start-up circuit connects to terminal Base of a 1st transistor, and terminal Collector of said 1st transistor connects to the other end of said 1st coil assembly of said primary-side coil assembly of said transformer;
- one end of said 2nd coil assembly of said primary-side coil assembly of said transformer connects to a resistor and to terminal Base of said 1st transistor, and the other end of said 2nd coil assembly connects to ground;
- terminal Emitter of said 1st transistor connects to said resistor and to ground;
- said 1st transistor connects to a 2nd transistor; terminal Base of said 2nd transistor connects to terminal Emitter of said 1st transistor, terminal Collector of said 2nd transistor connects to terminal Base of said 1st transistor, and terminal Emitter of said 2nd transistor connects to ground;
- an output circuit, including a rectifier diode with two ends and a controller, wherein the output end of said output circuit connects in parallel to a capacitor and to ground; the input end of said controller connects to the output voltage at said output end of said output circuit; and
- said controller further includes two control ends, a 1st and a 2nd control end, each connected to one of said two ends of said rectifier diode so that variations in said output voltage is detected by said controller and fedback to said 1st coil assembly of said primary-side coil assembly of said transformer for said 1st coil assembly to do a PWM or PFM switching to regulate output voltages.

11. The power converter with a secondary-side control as claimed in claim 10, wherein said rectifier diode is positioned at said output end.

12. The power converter with a secondary-side control as claimed in claim 10, wherein said rectifier diode is positioned at a grounding location.

13. The power converter with a secondary-side control as claimed in claim 10, wherein said controller determines three different states in circuit configuration between said two control ends, including a resistor load connection, a short circuit, and an open circuit.

14. The power converter with a secondary-side control as claimed in claim 13, wherein a resistor load connection and a open circuit appear between said two control ends at the command of said controller when said output voltage at said output end goes above a pre-set voltage threshold.

15. The power converter with a secondary-side control as claimed in claim 14, wherein a short circuit and an open circuit appear between said two control ends at the command of said controller when said output voltage at said output end goes below a pre-set voltage threshold.

* * * * *